(12) United States Patent
Robertson et al.

(10) Patent No.: US 8,966,286 B2
(45) Date of Patent: Feb. 24, 2015

(54) METHOD, SYSTEM AND INTEGRATED CIRCUIT FOR ENABLING ACCESS TO A MEMORY ELEMENT

(75) Inventors: Alistair Robertson, Glasgow (GB); Derek Beattie, Giffnock (GB); James Andrew Collier Scobie, Helensburgh (GB)

(73) Assignee: Freescale Semiconductor, Inc., Austin, TX (US)

( * ) Notice: Subject to any disclaimer, the term of this patent is extended or adjusted under 35 U.S.C. 154(b) by 241 days.

(21) Appl. No.: 13/133,958

(22) PCT Filed: Jan. 5, 2009

(86) PCT No.: PCT/IB2009/050010
§ 371 (c)(1),
(2), (4) Date: Jun. 10, 2011

(87) PCT Pub. No.: WO2010/076666
PCT Pub. Date: Jul. 8, 2010

(65) Prior Publication Data
US 2011/0258462 A1 Oct. 20, 2011

(51) Int. Cl.
*G06F 11/30* (2006.01)
*G06F 21/31* (2013.01)
*G06F 21/79* (2013.01)

(52) U.S. Cl.
CPC ............... *G06F 21/31* (2013.01); *G06F 21/79* (2013.01)
USPC ........................................................ 713/193

(58) Field of Classification Search
CPC ........................ G06F 21/10; G11B 20/00086
USPC ........................................... 713/193; 726/2, 27
See application file for complete search history.

(56) References Cited

U.S. PATENT DOCUMENTS

| | | | | |
|---|---|---|---|---|
| 6,067,621 A | * | 5/2000 | Yu et al. | 713/172 |
| 7,681,046 B1 | * | 3/2010 | Morgan et al. | 713/193 |
| 2002/0199110 A1 | | 12/2002 | Kean | |
| 2007/0156587 A1 | * | 7/2007 | Yu et al. | 705/50 |
| 2010/0064358 A1 | * | 3/2010 | Luna et al. | 726/6 |
| 2010/0070748 A1 | * | 3/2010 | Duan et al. | 713/2 |

FOREIGN PATENT DOCUMENTS

| | | |
|---|---|---|
| EP | 0919904 A | 6/1999 |
| WO | 2006/069274 A | 6/2006 |

OTHER PUBLICATIONS

Simson Garfinkel, Gene Spafford: "Pratical Unix and Internet Security" [Online] 1996, XP002546202, ISBN: 1 56592 148 8, Retrieved from the Internet: URL:http://docstore.mik.ua/orelly/networking/puis/index.htm> [Retrieved on Sep. 17, 2009] Chapter 8, Section 8.6, The Unix Encrypted Password System.

(Continued)

*Primary Examiner* — Anthony Brown (57) ABSTRACT

A system comprises signal processing logic that is operably coupled to at least one memory element and is arranged to enable access to the at least one memory element. The signal processing logic is arranged to receive a security key, generate a system key using the received security key and a system specific seed, perform a comparison of the generated system key to a reference key stored in an area of memory of the at least one memory element. The signal processing logic is also arranged to configure a level of access to the at least one memory element based at least partly on the comparison of the generated system key to the reference key stored in memory.

20 Claims, 4 Drawing Sheets

(56) References Cited

OTHER PUBLICATIONS

Wheeler David J et al: "Tea, A Tiny Encryption Algorithm" Lecture Notes in Computer Science (Leuven, Belgium: Fast Software Encryption: Second International Workshop), Dec. 16, 1994, pp. 1008: 363-366.

International Search Report and Written Opinion correlating to PCT/IB2009/050010 dated Sep. 30, 2009.

* cited by examiner

METHOD, SYSTEM AND INTEGRATED CIRCUIT FOR ENABLING ACCESS TO A MEMORY ELEMENT

FIELD OF THE INVENTION

The field of this invention relates to a method, system and integrated circuit comprising signal processing logic for enabling access to a memory element.

BACKGROUND OF THE INVENTION

In the field of this invention, it is known for signal processing devices, such as microcontrollers, to be operably coupled to memory elements, and for such memory elements to have stored therein instructions to be executed by the signal processing devices. The memory elements also contain stored data to be used during the execution of those instructions. For some applications, the data stored within the memory elements may be in need of protection from being illegitimately read or modified. For example, modern vehicles may comprise many microcontrollers, for example forming part of electronic control units (ECUs), arranged to manage various vehicle subsystems. Typically, the largest of these microcontrollers is in the engine control unit, which is operably coupled to a non-volatile memory element comprising engine mapping data and the like. Vehicle manufacturers spend a lot of time and effort calibrating and tuning the engines, the resulting calibration data being stored within these memory elements, for example in a form of multi-dimensional tables. During runtime, the engine control unit uses these tables to look up engine calibration data to determine the desired engine behaviour for a given state of the engine, for example spark timing, fuel injection timing, etc. As will be appreciated, if this engine calibration data were altered, the engine could be re-tuned. Such re-tuning could not only affect the performance of the engine, but also have significant safety and warrant implications. Thus, it is important that protection is provided to such data stored in memory, in order to protect the data from illegitimate access and manipulation.

Figure 1:
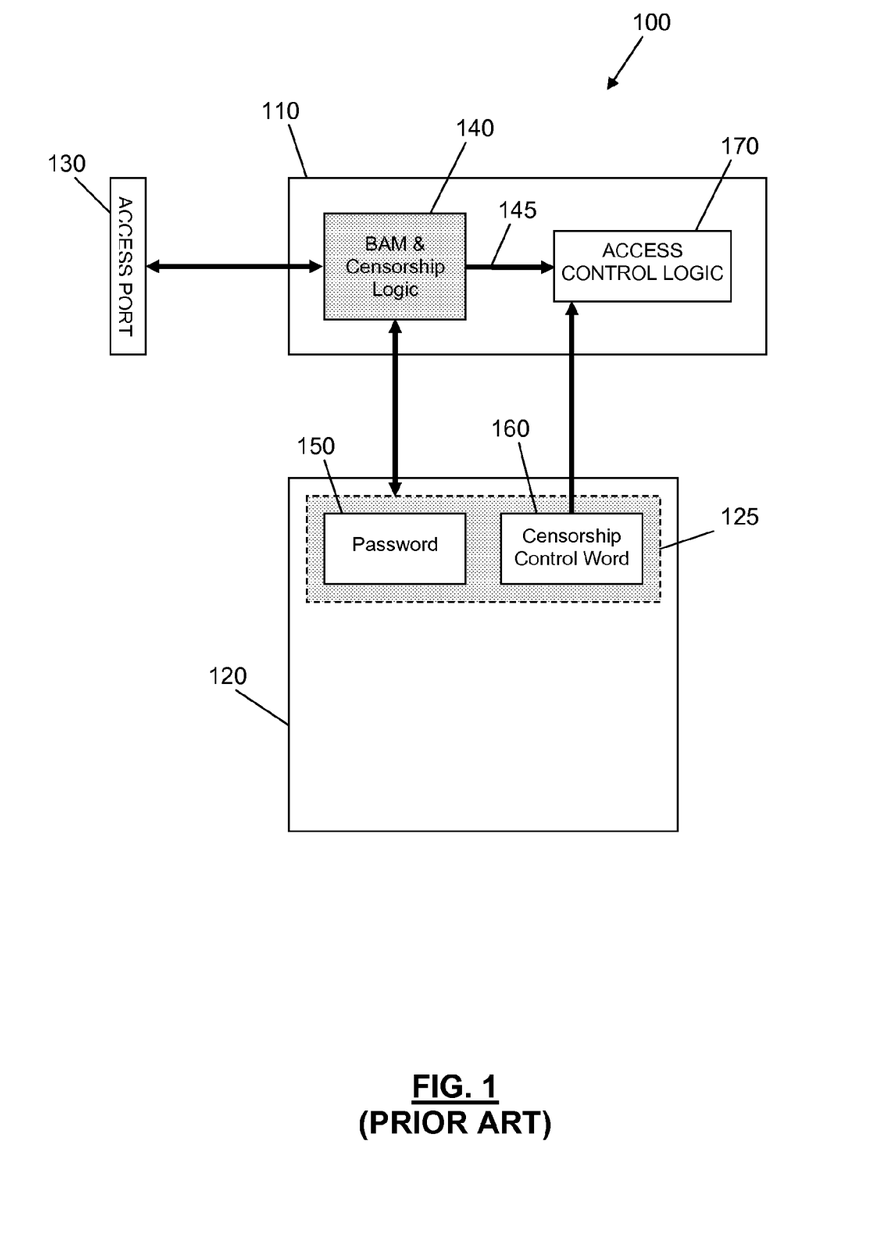
FIG. 1 illustrates an example of a known microcontroller system.

FIG. 1 illustrates an example of a microcontroller system 100 as is known in the art, for example such as might be used to implement an engine control unit within a vehicle. The microcontroller system 100 comprises signal processing logic in a form of a microcontroller 110. The microcontroller 110 is operably coupled to a non-volatile memory element 120 comprising instructions to be executed by the microcontroller 110, along with data used during the execution of those instructions, such as engine mapping data in the case of an engine control unit. For the illustrated example, the microcontroller 110 is operably coupled to an access port 130, for example a test access port such as a JTAG (Joint Test Action Group) serial port used during testing and for diagnosis purposes etc. Access to the memory element 120 may be made available to external devices via the access port 130 and the microcontroller 110.

As previously mentioned, for applications such as an engine control unit, it is important that protection is provided to data stored in the memory element 120 in order to protect the data from illegitimate access, such as access from an external device via the access port 130. Accordingly, for the illustrated example, the microcontroller 110 comprises censorship logic, which for the illustrated example forms a part of a Boot Assist Module (BAM) 140. The Boot Assist Module 140 typically comprises a hard coded piece of software that is resident within the microcontroller 110, and which is executed upon exiting a reset, and which provides some initial configuration to the microcontroller 110. In particular, the Boot Assist Module 140 provides a mechanism whereby an external device, for example a diagnostic tool, is able to input a password, or security key, via the access port 130. Upon receipt of such a password, the Boot Assist Module 140 is able to compare the received password with a password stored in memory 150. If the passwords match, the censorship logic of the Boot Assist Module 140 permits access to the memory and/or debug resources of the microcontroller system 100. In particular for the illustrated example, a censorship control word 160 is used to define the censorship scheme, and thus the access permitted. Subsequent access to the memory element 120 is implemented through access control logic 170, which receives an indication 145 from the Boot Assist Module as to whether or not access is permitted. When access is to be permitted, the access control logic 170 reads the censorship control word 160 and enables or restricts access to the memory element 120 accordingly. Notably, access to the memory and/or debug resources of the device is only temporarily permitted by a matching password, and following a subsequent reset of the microcontroller system 100 is again locked (or at least restricted). Conversely, if no password is received, or an incorrect password is received, the censorship logic of the Boot Assist Module 140 locks, or otherwise restricts, access to the memory element 120 via the access port 130. In this manner, access to the memory element 120, and thereby access to the sensitive data contained within the memory element 120, may be prevented via the access port 130 unless a valid password is input.

Manufacturers often do not want to have to maintain databases that contain large numbers of passwords for accessing the memory elements of large numbers of microcontroller systems. It is therefore known to use a common password or security key to control access to a large number of microcontroller systems. In this manner, it is not necessary to keep track of a large number of individual passwords. However, a problem with this approach is that, if a 'hacker' manages to obtain the password, and in particular if the hacker manages to 'open' the microcontroller system 100 and gain access to the copy of the password 150 stored in memory, that hacker is then able to use that password to access the memory elements of all other microcontroller systems that use the same password via their access ports. Clearly this is an unacceptable security risk.

SUMMARY OF THE INVENTION

The invention provides a system, an integrated circuit and a method for enabling access to at least one memory element as described in the accompanying claims.

Specific examples of the invention are set forth in the dependent claims.

These and other aspects of the invention will be apparent from and elucidated with reference to the examples described hereinafter.

BRIEF DESCRIPTION OF THE DRAWINGS

Further details, aspects and examples of the invention will be described, by way of example only, with reference to the drawings. Elements in the figures are illustrated for simplicity and clarity and have not necessarily been drawn to scale.

DETAILED DESCRIPTION

Figure 2:
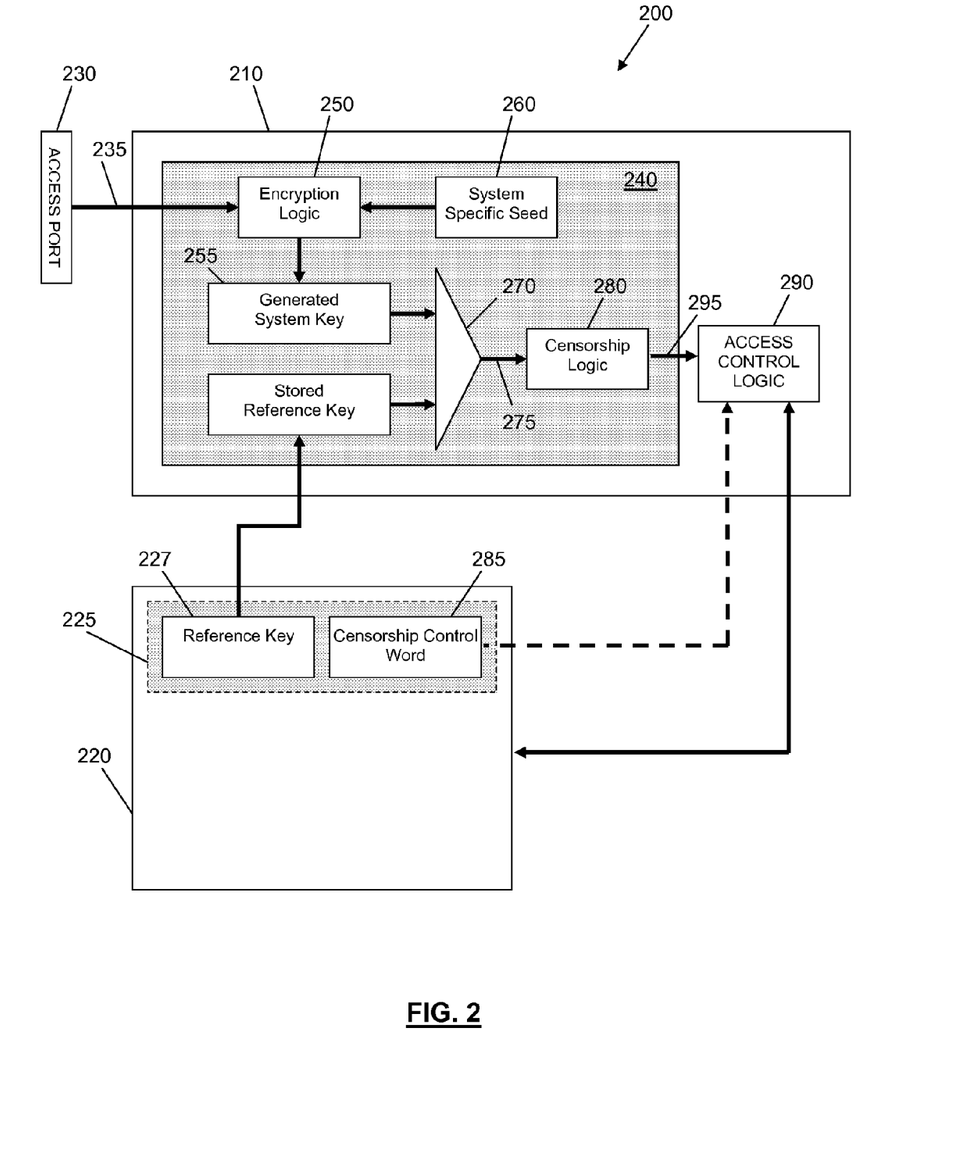
FIG. 2 illustrates an example of a signal processing system.

Referring first to FIG. 2, there is illustrated an example of a signal processing system 200. For example, the signal processing system 200 may comprise a microcontroller system, such as an electronic control unit (ECU) within a vehicle, for example the engine control unit. The signal processing system 200 comprises signal processing logic 210 operably coupled to at least one memory element 220, and arranged to enable access to the at least one memory element 220. The at least one memory element 220 may comprise non-volatile memory, with instructions to be executed by the signal processing logic 210 stored therein. The at least one memory element 220 may further have stored therein data to be used during the execution of those instructions, such as engine mapping data, etc. in the case of an engine control unit.

As previously mentioned, for applications such as an engine control unit application, it is important that protection is provided to data, etc. that is stored in memory in order to protect the data from illegitimate access, such as access from an external device. Accordingly, the signal processing logic 210 is arranged to receive 235 a security key and to generate a system key 255 using the received security key 235 and a system specific seed 260. Thereafter, the signal processing logic 210 is arranged to perform a comparison of the generated system key 255 to a reference key 227 that is stored in an area of memory, and to configure a level of access to the at least one memory element 220 based at least partly on the comparison.

In this manner, the at least one memory element 220 (and thereby data, etc. stored therein) may be provided with protection against, for example, illegitimate access from an external device. As a result, in order to obtain, for example, unrestricted access, the appropriate security key may be required to be provided to the signal processing logic 210. However, in one example, security key is not stored within an area of memory of the signal processing system 200. Accordingly, even if a hacker is able to 'open' the signal processing system 200 and gain access to the reference key 227 stored in memory 220, this reference key 227 may not be used to directly access memory elements of other signal processing systems that use the same security key.

Thus, a common security key may be used for a large number of signal processing systems, without a hacker being able to obtain the common security key by simply opening one signal processing system and gaining access to the key stored in memory. Furthermore, by using a system specific seed 260 in combination with the received security key to generate the system key, each signal processing system may comprise a substantially unique system key and reference key, even if a common security key is used, thereby further improving the level of protection afforded.

For the various examples herein described and illustrated in the drawings, only a single memory element 220 is referred to and illustrated for simplicity. However, it will be appreciated that the signal processing logic 210 may be operably coupled to a plurality of memory elements, and may be arranged to enable access to one or more of the plurality of memory elements. Furthermore, in accordance with a further example, the one or more memory elements, such as memory element 220, may comprise a variety of non-volatile memory types, such as Flash memory or the like.

For the illustrated example, the signal processing logic 210 is operably coupled to an access port 230, via which the signal processing logic 210 is arranged to receive the security key 235. The security key 235 may comprise any suitable format, such as a 64-bit or 128-bit binary string. The access port 230 may comprise a test port, for example in a form of a Joint Test Action Group (JTAG) port. Alternatively, the access port 230 may comprise a network interface, for example in a form of a Controller Area Network (CAN) interface, commonly used within the automotive industry, or in a form of a more generic Serial Communication Interface (SCI).

The signal processing logic 210 may be arranged to execute program code, for example in the form of instructions stored within a computer-readable storage element, such as memory element 220. In particular, the signal processing logic 210 of FIG. 2 may be arranged to execute program code comprising memory access configuration logic 240. The memory access configuration logic 240 may form part of a boot assist module (not shown), for example comprising a hard-coded item of software that is resident within the signal processing system 200, and which may be executed upon exiting a reset, and which may provide some initial configuration to the signal processing system 200.

The memory access configuration logic 240 comprises encryption logic 250. The encryption logic 250 may be arranged to receive the security key 235, for example via the access port 230, along with a system specific seed 260, and to generate a system key 255 using the received security key 235 and system specific seed 260. For example, the encryption logic 250 may be arranged to generate the system key 255 using a block cipher encryption algorithm such as an Advance Encryption Standard (AES) encryption algorithm (a Federal Information Processing Standard (FIPS) of the United States Government) or a TINY Encryption Algorithm (TEA) (a well known block cipher developed by David Wheeler and Roger Needham of the Cambridge Computer Laboratory, first presented at the Fast Software Encryption workshop in Leuven in 1994, and first published in the proceedings of that workshop—Wheeler, David J.; Needham, Roger M. (1994-12-16). "TEA, a tiny encryption algorithm". *Lecture Notes in Computer Science* (Leuven, Belgium: Fast Software Encryption: Second International Workshop) 1008: 363-366). However, the encryption logic 250 may be arranged to use any suitable alternative encryption algorithm or the like, in order to generate the system key 255 from the security key 235 and the system specific seed 260.

The system specific seed 260 may comprise any suitable system specific value, such as a 64-bit or 128-bit binary string. For example, the system specific seed 260 may comprise a device identifier, and in particular a non-memory mapped device identifier. For example, the system specific seed 260 may comprise x-y wafer coordinates and a wafer lot number for the signal processing logic 210. In this manner, the location of the device identifier may not be addressed by software executed on the signal processing logic 210. Instead, the value of the device identifier may be provided to software executing on the signal processing logic 210 by means of hardware logic.

The signal processing logic 210 comprises validation logic 270, which for the illustrated example forms a part of the memory access configuration logic 240. The validation logic 270 is arranged to compare the system key 255 generated by the encryption logic 250 to the reference key 227 stored in memory, and outputs 275 the result of the comparison. The system key 255 and reference key 227 may comprise any suitable format, such as a 64-bit or 128-bit binary string. The signal processing logic 210 further comprises censorship logic 280, which for the illustrated example also forms a part of the memory access configuration logic 240. The output 275 of the validation logic 270 may be provided to the censorship logic 280, which may be arranged to configure a level of access to the memory element 220 based at least partly on the result of the comparison of the generated system key 255 to the reference key 227 stored in memory. In particular for the illustrated example, the censorship logic 280 may be arranged to output an indication 295 as to the level of access to the memory element, based at least partly on the result of the comparison of the generated system key 255 to the reference key 227 stored in memory. For example, if the generated system key 255 and the reference key 227 stored in memory match, thereby indicating that a valid security key 235 has been received, the censorship logic 280 may output an indication 295 indicating that access to the memory element 220 is to be enabled. Conversely, if the generated system key 255 and the reference key 227 stored in memory do not match, thereby indicating that an incorrect or invalid (or no) security key 235 has been received, the censorship logic 280 may output an indication 295 indicating that access to the memory element 220 is not to be enabled, or is at least restricted.

Furthermore for the illustrated example, a censorship control word 285 may be used to define a censorship scheme for the memory element 220, and thus the access permitted thereto. Subsequent access to the memory element 220 may be enabled via access control logic 290, which receives the indication 295 output by the censorship logic 280, where the indication 295 indicates the level of access permitted. When access to the memory element 220 is to be permitted, the access control logic 290 reads the censorship control word 285 and accordingly enables or restricts access to the memory element 220. Conversely, if access to the memory element 220 is not to be permitted, the access control logic 290 locks or otherwise restricts access to the memory element 220. In this manner, access to the memory element 220, and thereby access to the sensitive data contained within the memory element 220, may be prevented, for example via the access port 230, unless a valid security key is input.

Access to the memory element 220 may be only temporarily permitted by a matching password, and following a subsequent reset of the signal processing system 200 is again locked (or at least restricted). For example, as previously mentioned, the memory access configuration logic 240 may form part of a boot assist module (not shown) that may comprise a hard coded piece of software that may be resident within the signal processing system 200, and which may be executed upon exiting a reset, and which may provide some initial configuration to the signal processing system 200. In this manner, access to the memory element 220 may be configured during this initial configuration by way of the access control logic 290 outputting the appropriate indication 295, and by way of the censorship control word 285, as described above. Once the boot assist module has completed its tasks, it may be able to load one or more default applications to be executed by the signal processing logic 210 before ending. As previously mentioned, the signal processing system 200 may further comprise memory access control logic 290, via which applications running on the signal processing logic 210 access the memory element 220. The memory access control logic 290 is arranged to read the censorship control word 285 stored in an area of memory and enable or disable/restrict access to the memory element based on the value of the censorship control word 285. Thus, for applications subsequently executed by the signal processing logic 210, including applications enabling access for an external device via access port 230, access to the memory device 220 may be routed through the memory access control logic 290. In this manner, the memory access control logic 290 may be able to control the access to memory element 220 provided to applications based on the censorship control word 285. The censorship control word may comprise a predetermined masking value, preconfigured during the initial configuration of the signal processing system 200.

The signal processing logic 210 may be arranged to cause access to the memory element 220 to be partially restricted if the comparison of the generated system key 255 to the reference key 227 stored in memory results in a mismatch there between. In this manner, applications executed on the signal processing logic 210 may be provided with partial access, for example read access, when an invalid (or no) security key is received.

Alternatively, the signal processing logic 210 may be arranged to cause access to the memory element 220 to be disabled if the comparison of the generated system key 255 to the reference key 227 stored in memory results in a mismatch there between. In this manner, applications executed on the signal processing logic 210 may be barred from accessing the memory element 220 when an invalid (or no) security key is received. It is worth noting that, in the case where access to memory element 220 is disabled, or restricted, applications executed on the signal processing logic 210 may still have access to other resources and memory elements (not shown).

Conversely, the signal processing logic 210 may be arranged to enable substantially unrestricted access to the memory element 220 if the comparison of the generated system key 255 to the reference key 227 stored in memory 225 results in a match there between. In this manner, when a valid security key (i.e. one that results in a system key 255 being generated that matches the reference key 277) is received, applications executed on the signal processing logic 210 may be provided with, say, full access, for example both read and write access.

For the illustrated embodiment, the reference key 227 and the censorship control word 285 are stored within a shadow row 225 of the memory element 220. As will be appreciated by a skilled artisan, a shadow row is an area of, say, Flash memory that is typically reserved for configuration data. In addition, the memory access configuration logic 240 may be arranged to access those areas of memory comprising the shadow row 225 within which the reference key 227 and the censorship control word 285 are stored via side ports of the memory element 220. In this manner, the memory access configuration logic 240 is able to bypass the access control logic 290.

Figure 3:
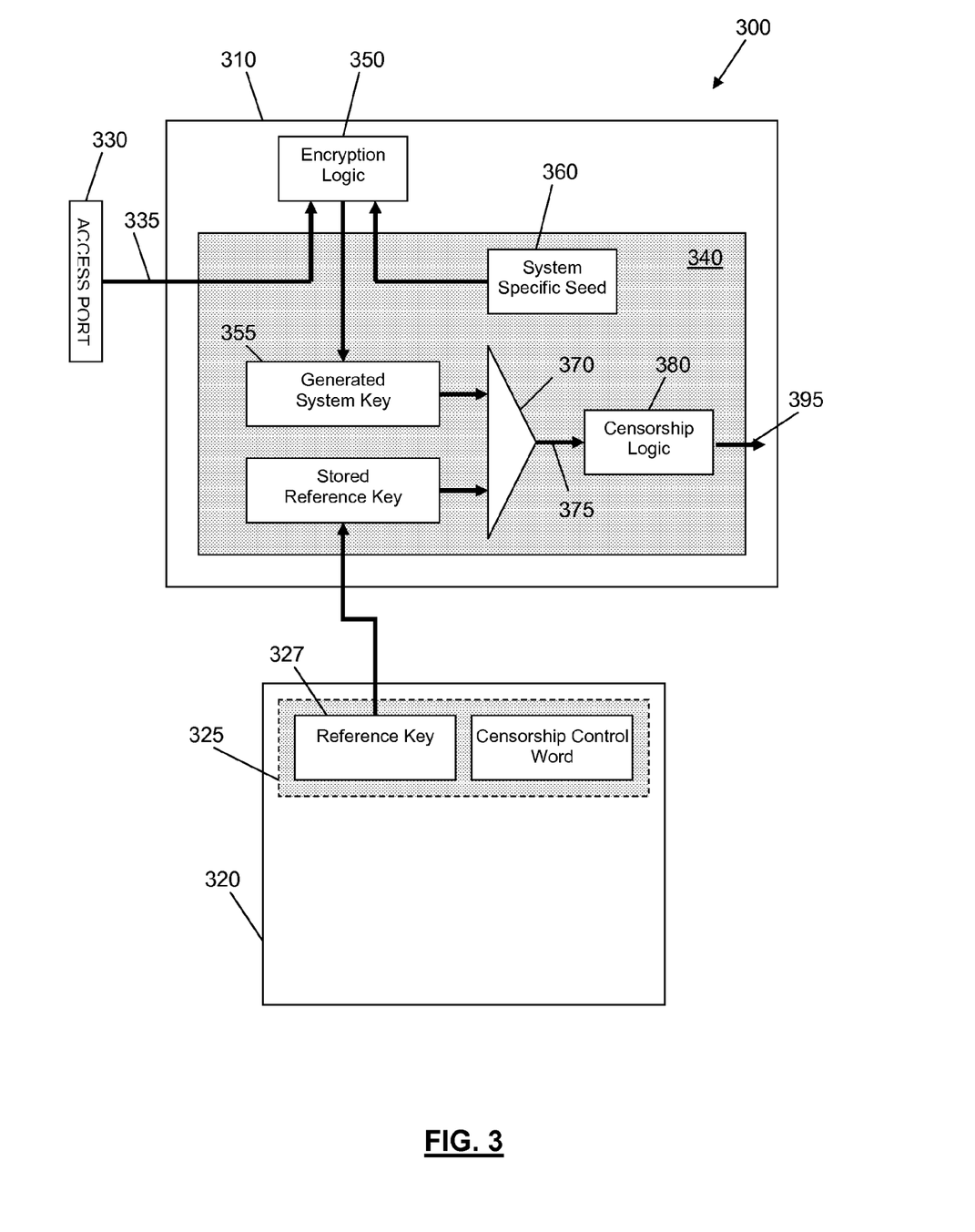
FIG. 3 illustrates an example of a signal processing system.

Referring now to FIG. 3, there is illustrated an alternative example of a signal processing system 300. The signal processing system 300 comprises signal processing logic 310 operably coupled to at least one memory element 320, and arranged to enable access to the at least one memory element 320. In particular, the signal processing logic 310 is arranged to receive a security key 335, and generate a system key 355 using the received security key 335 and a system specific seed 360, The signal processing logic 310 is also arranged to perform a comparison of the generated system key 355 to a reference key 327 that is stored in an area of memory 325, and to configure a level of access to the at least one memory element 320 based at least partly on the comparison.

For the illustrated example, the signal processing logic 310 is operably coupled to an access port 330, via which the signal processing logic 310 is arranged to receive the security key 335. As previously mentioned, the access port 330 may comprise a test port, for example in a form of a Joint Test Action Group (JTAG) port. Alternatively, the access port 230 may comprise a network interface, for example in a form of a Controller Area Network (CAN) interface, commonly used within the automotive industry, or in a form of a more generic Serial Communication Interface (SCI).

The signal processing logic 310 may be arranged to execute program code, for example in the form of instructions stored within a computer-readable storage element, such as memory element 320. In particular, the signal processing logic 310 may be arranged to execute program code comprising memory access configuration logic 340. The memory access configuration logic 340 may form a part of a boot assist module (not shown), for example comprising a hard-coded piece of software that is resident within the signal processing system 300, and which may be executed upon exiting a reset, and which may provide some initial configuration of the signal processing system 300.

For the signal processing system 300 of FIG. 3, the signal processing system 300 comprises hardware encryption logic 350, for example in a form of a hardware encryption engine, arranged to receive the security key 335 and the system specific seed 360, and to generate the system key 355 there from. In particular for the illustrated example, the hardware encryption logic 350 forms a part of the signal processing logic 310. However, the hardware encryption logic 350 may alternatively be provided external to the signal processing logic 310. The encryption logic 350 may be arranged to receive the security key 335, for example via the access port 330, along with a system specific seed 360, and to generate a system key 355 using the received security key 335 and system specific seed 360. For example, the encryption logic 350 may be arranged to generate the system key 355 using a block cipher encryption algorithm such as an AES or TINY encryption algorithm.

The signal processing logic 310 comprises validation logic 370, which for the illustrated example forms a part of the memory access configuration logic 340. The validation logic 370 may be arranged to compare the system key 355 generated by the encryption logic 350 to the reference key 327 that may be stored in memory, and outputs 375 the result of the comparison. The signal processing logic 310 may further comprise censorship logic 380, which for the illustrated example also forms a part of the memory access configuration logic 340. The output 375 of the validation logic 370 may be provided to the censorship logic 380, which may be arranged to configure a level of access to the memory element 320 based at least partly on the result of the comparison of the generated system key 355 to the reference key 327 stored in memory. In particular for the illustrated example, the censorship logic 380 may be arranged to configure the level of access to the memory element 320 by outputting an indication 395 as to the level of access to the memory element 320, based at least partly on the result of the comparison of the generated system key 355 to the reference key 327 stored in memory.

Figure 4:
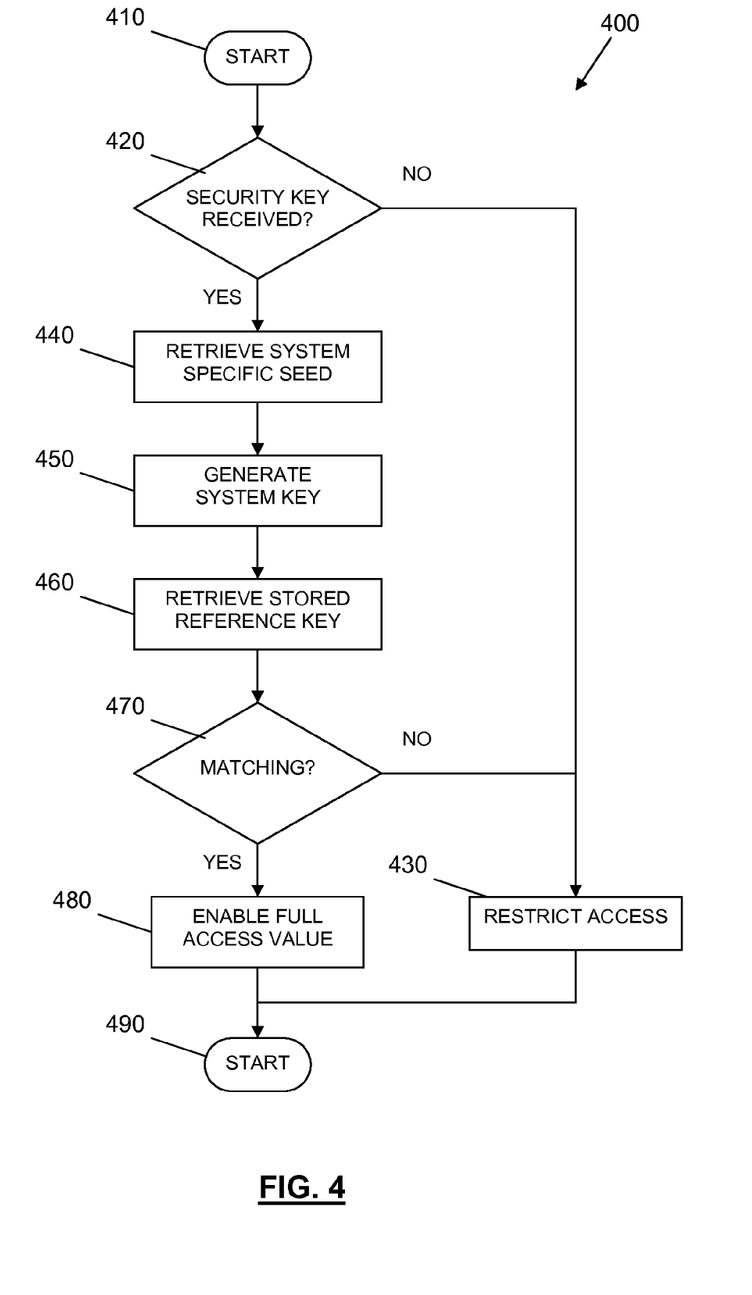
FIG. 4 illustrates an example of a simplified flowchart of a method for enabling access to a memory element.

Referring now to FIG. 4, there is illustrated an example of a simplified flowchart 400 of a method for enabling access to at least one memory element within a signal processing system. The method starts at step 410, and moves to step 420, where it is determined whether or not a security key has been received. If no security key has been received in step 420, the method moves to step 430, where access to the at least one memory element is configured to be at least partially restricted. For example, a censorship word within an area of memory may be set to a value that indicates that access to the memory element is to be restricted. The method then ends at step 490.

Referring back to step 420, if a security key has been received, the method moves to step 440, where a system specific seed is retrieved from an area of memory. Next, in step 450, a system key is generated using the received security key and the system specific seed. The method then moves on to step 460, where a reference key is retrieved from an area of memory. The generated system key and the reference key are then compared, in step 470. If the generated system key does not match the reference key, the method moves to step 430, where access to the at least one memory element is configured to be at least partially restricted. However, if the generated system key matches the reference key, the method moves to step 480, where access to the at least one memory element is configured to be enabled. For example, a censorship word within an area of memory may be set to a value that indicates that access to the memory element is to be enabled. The method then ends at step 490.

The method of FIG. 4 may be implemented in a computer program for running on a signal processing system, at least including code portions for performing steps of a method according to the invention when run on a programmable apparatus, such as a computer system or enabling a programmable apparatus to perform functions of a device or system according to examples of the invention. The computer program may, for instance, include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a computer-readable storage element that comprises at least one of a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory, the computer program being stored with data loadable in a memory of a signal processing system, the data representing the computer program. The computer-readable storage element may further be a data connection, such as a telephone cable or a wireless connection.

Although for the illustrated examples of the invention hereinbefore described a single reference key has been described as being stored in memory, and used to substantially validate a received security key, it is contemplated that more than one reference key may be stored in memory. In this manner, more than one security key may be used to configure different levels of access. For example, a received security key may be used (along with a system specific seed) to generate a system key. The system key may then be compared to a first reference key stored in memory. If there is a match, access to the memory element may be fully enabled, for example both full read and write access may be enabled. If the system key does not match the first reference key, it may then be compared to a second reference key. If the system key matches the second reference key, then an intermediate level of access to the memory element may be configured. For example, full read access may be enabled, whilst only limited write access is enabled, for example only to certain areas within the memory element. Finally, if the system key does not match either of the reference keys, access to the memory element may be restricted to, say, read only access, or even prohibited entirely.

Furthermore, it is contemplated that the signal processing logic may be arranged to implement a time delay between receiving security keys. In this manner, if an invalid security key is received, the signal processing system will not accept a new security key until a determined time period has elapsed. In this manner, an attempt by a hacker to cycle through all possible security key variations may be significantly hampered. For example, for a 64-bit security key, it would take $2^{64}$ attempts to cycle through all possible security key variations. By implementing even a small time delay of, say, a second between receiving security keys, the time required to cycle through all possible variations may be significantly increased to a point where such an attempt to 'break' the security code becomes substantially unfeasible.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different examples may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above examples, as applicable, may be implemented using a variety of different information processing systems. For example, although FIG. 2, FIG. 3 and the discussion thereof describe an exemplary signal processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative examples may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also, in one example, the illustrated elements of system 200 may comprise circuitry located on a single integrated circuit or within a same device. Alternatively, system 200 may include any number of separate integrated circuits or separate devices interconnected with each other. For example, memory 220 may be located on a same integrated circuit as signal processing logic 210, or on a separate integrated circuit, or located within another peripheral or slave device discretely separate from other elements of system 200. Furthermore, for the examples illustrated in FIGS. 2 and 3, the validation logic 270, 370 and censorship logic 280, 380 have been illustrated and described as being implemented as part of the memory access configuration logic 240, 340, and are implemented by way of software. However, the validation logic 270, 370 and/or censorship logic 280, 380 may equally be implemented by way of hardware modules, and may be implemented within or external to the signal processing logic 210, 310. Also, for example, system 200 or portions thereof may be soft or code representations of physical circuitry or of logical representations convertible into physical circuitry. As such, system 200 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples.

All or some of the software described herein may be received elements of system 200, 300, for example, from computer-readable media such as memory 220, 320 or other media on other computer systems. Such computer readable media may be permanently, removably or remotely coupled to an information processing system such as signal processing logic 200, 300. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one example, system 200, 300 may comprise a computer system such as a personal computer system. Other examples may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system comprising:
signal processing logic coupled to a memory element and comprising a system specific seed, wherein the system specific seed is unique to the signal processing logic, wherein the signal processing logic is arranged to receive via an external port of the signal processing logic a security key, generate a system key based upon the received security key and the system specific seed, compare the generated system key to a reference key stored in an area of the memory element, and configure a level of access to the memory element based on the comparison of the generated system key to the reference key.

2. The system of claim 1 wherein the signal processing logic is arranged to cause access to the memory element to be restricted if the comparison of the generated system key to the reference key results in a mismatch there between.

3. The system of claim 1 wherein the signal processing logic is arranged to enable unrestricted access to the memory element if the comparison of the generated system key to the reference key results in a match there between.

4. The system of claim 1 wherein the system further comprises a hardware encryption engine arranged to receive the security key and the system specific seed, and to generate the system key there from.

5. The system of claim 4 wherein the hardware encryption engine forms a part of the signal processing logic.

6. The system of claim 1 wherein the system key is generated using one of: an Advanced Encryption Standard (AES) encryption algorithm, a TINY encryption algorithm.

7. The system of claim 1 wherein the system specific seed comprises a non-memory mapped device identifier.

8. The system of claim 7 wherein the system specific seed comprises x-y wafer coordinates and a wafer lot number for use by the signal processing logic.

9. The system of claim 1 wherein the signal processing logic comprises censorship logic arranged to configure the level of access to the memory element by setting a censorship control word in the area of memory element.

10. The system of claim 1 wherein the signal processing logic is arranged to implement a time delay between receiving security keys.

11. The system of claim 1 wherein the memory element comprises non-volatile memory.

12. The system of claim 1 wherein the signal processing logic is arranged to receive the security key via at least one of a test port and a network interface.

13. The system of claim 12 wherein the signal processing logic is arranged to receive the security key via at least one of:
a Joint Test Action Group (JTAG) port;
a Controller Area Network (CAN) interface; and
a Serial Communication Interface (SCI).

14. A method for enabling access to a memory element within a signal processing system, the method comprising:
receiving, at a signal processing logic of the signal processing system, a security key, wherein the security key is received via an external port of the signal processing logic;
generating a system key based upon the received security key and a system specific seed, wherein the system specific seed is unique to the signal processing logic;
performing a comparison of the generated system key to a reference key stored in an area of the memory element; and
configuring a level of access to the memory element based on the comparison of the generated system key to the reference key, wherein the level of access to the memory is provided to the port.

15. A non-transitory computer-readable storage element comprising executable program code for programming signal processing logic, the computer-readable storage element comprising program code for:
receiving, at signal processing logic, a security key, wherein the security key is received via an external port of the signal processing logic;
generating a system key based upon the received security key and a system specific seed, wherein the system specific seed is unique to the signal processing logic;

performing a comparison of the generated system key to a reference key stored in an area of a memory element operably coupled to the signal processing logic; and configuring a level of access to the memory element based on the comparison of the generated system key to the reference key.

16. The computer-readable storage element of claim 15, wherein the computer-readable storage element comprises at least one of a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

17. The method of claim 14 wherein the system key is generated using one of: an Advanced Encryption Standard (AES) encryption algorithm, a TINY encryption algorithm.

18. The method of claim 14 wherein the system specific seed comprises x-y wafer coordinates and a wafer lot number for use by the signal processing logic.

19. The method of claim 14 wherein the system specific seed comprises a non-memory mapped device identifier.

20. The system of claim 1, wherein the system specific seed is provided to software executing on the signal processing logic by hardware logic.

* * * * *